(12) United States Patent
Pekarek-Kostka

(10) Patent No.: US 8,321,459 B2
(45) Date of Patent: Nov. 27, 2012

(54) METHOD AND SYSTEM FOR FACILITATING ACCESS TO ALWAYS CURRENT CONTACT INFORMATION

(76) Inventor: Peter Pekarek-Kostka, Middletown, CT (US)

( * ) Notice: Subject to any disclaimer, the term of this patent is extended or adjusted under 35 U.S.C. 154(b) by 2454 days.

(21) Appl. No.: 09/974,100

(22) Filed: Oct. 10, 2001

(65) Prior Publication Data

US 2002/0049828 A1 Apr. 25, 2002

Related U.S. Application Data

(60) Provisional application No. 60/239,519, filed on Oct. 11, 2000.

(51) Int. Cl.
*G06F 17/00* (2006.01)
(52) U.S. Cl. ........ 707/781; 707/782; 707/783; 707/787; 707/789
(58) Field of Classification Search .................. 707/102, 707/104.1, 100, 781, 782, 783, 787, 789; 709/203; 705/1
See application file for complete search history.

(56) References Cited

U.S. PATENT DOCUMENTS

| 5,710,884 | A | * | 1/1998 | Dedrick | 709/217 |
| 5,717,923 | A | * | 2/1998 | Dedrick | 1/1 |
| 6,260,148 | B1 | * | 7/2001 | Aggarwal et al. | 726/14 |
| 6,549,612 | B2 | * | 4/2003 | Gifford et al. | 379/67.1 |
| 2002/0035493 | A1 | * | 3/2002 | Mozayeny et al. | 705/5 |

* cited by examiner

*Primary Examiner* — Sana Al Hashemi

(57) ABSTRACT

The present invention provides a method and system for facilitating access to always current contact information. Users submit their personal contact information or a collection of third party contact information or both to a storage location, where records are being searched for identical or similar entries. In case of a match the third party contact information is replaced with a link or pointer to the personal contact information entry of the owner of the information. As long as the owner of the information updates his records in the storage location, all third party contact information collections are also kept up to date and users will benefit from the most accurate and current contact information available.

20 Claims, 3 Drawing Sheets

METHOD AND SYSTEM FOR FACILITATING ACCESS TO ALWAYS CURRENT CONTACT INFORMATION

This application claims the benefit of U.S. Provisional Application No. 60/239,519 filed Oct. 11, 2000, under 35 U.S.C. Sec. 119(e).

BACKGROUND OF THE INVENTION

1. Field of the invention

The present invention relates to contact information management methods and systems, and more particularly to linking contact information to keep contact information current.

2. Background

The present invention addresses deficiencies of traditional contact information management methods and systems used to enter, store, retrieve, update, and share contact information of any kind including but not limited to home telephone number, work telephone number, fax number, e-mail address, and mailing address. Traditional contact information management systems utilize a physical book or an electronic storage device, which contains names, addresses, phone numbers, or other contact information. The user initially enters contact information into the book or electronic storage device to have contact information available for future lookups, e.g., when the user needs to place a call to one of his contacts and requires the appropriate phone number information. This kind of information storage is of static nature and changes to contact information require the user to perform the necessary changes and adjustments to the contact information record in the physical book or electronic storage device. As contact information changes frequently many updates are not properly communicated and not adjusted accordingly—resulting in out-dated or inaccurate contact information records in the physical book or electronic storage device. Even many publicly available contact information sources including but not limited to phone directories are not updated instantaneously, but only periodically, e.g., white pages published on an annual basis, leading to information deficiencies.

SUMMARY OF THE INVENTION

The present invention provides a method and system for dynamic contact information management facilitating access to always current contact information. Users submit their current contact list, or their individual personal contact information, or both to one centralized server or multiple interconnected servers. The server scans all submitted contact list entries to determine whether a matching personal contact information entry is already located on the server or is accessible by the server. If there is a match, the submitted contact list entry is replaced by a link or pointer to the matching personal contact information entry. Future changes to this personal contact information entry, which is maintained and updated by the owner of the information, are immediately reflected in all contact lists linked to the respective contact information entry. Contact lists can be made available to the user through a variety of ways, including but not limited to, via the Wireless Web to cellular phones, via the Internet to desktop PCs, or via voice response services to any telephone.

BRIEF DESCRIPTION OF THE DRAWINGS

These and other objects and advantages of the invention will be evident from the following description of the preferred embodiment, made with reference to the accompanying drawings, in which.

DETAILED DESCRIPTION OF THE PREFERRED EMBODIMENT OF THE INVENTION

The general method and system of the present invention will be described with reference to FIGS. 1, 2, and 3. While the invention will be described in conjunction with the preferred embodiment, it will be understood that it is not intended to limit the present invention to this embodiment. On the contrary, the invention is intended to cover alternatives, modifications, and equivalents, which may be included within the spirit and scope of the invention as defined by the appended claims.

In the most general sense, the invention pertains to a method and system for linking contact information between users to facilitate access to the most current contact information. Accordingly, the invention facilitates management of contact information by providing a method and system for linking contact information between a plurality of users. Users submit their personal contact information and other contact information to a central or centrally accessible storage area. Some or all elements of the submitted contact information are then compared to contact information submitted by other users and stored in the same storage area. A match of elements establishes a link between personal contact information of one user and other users.

Figure 1:
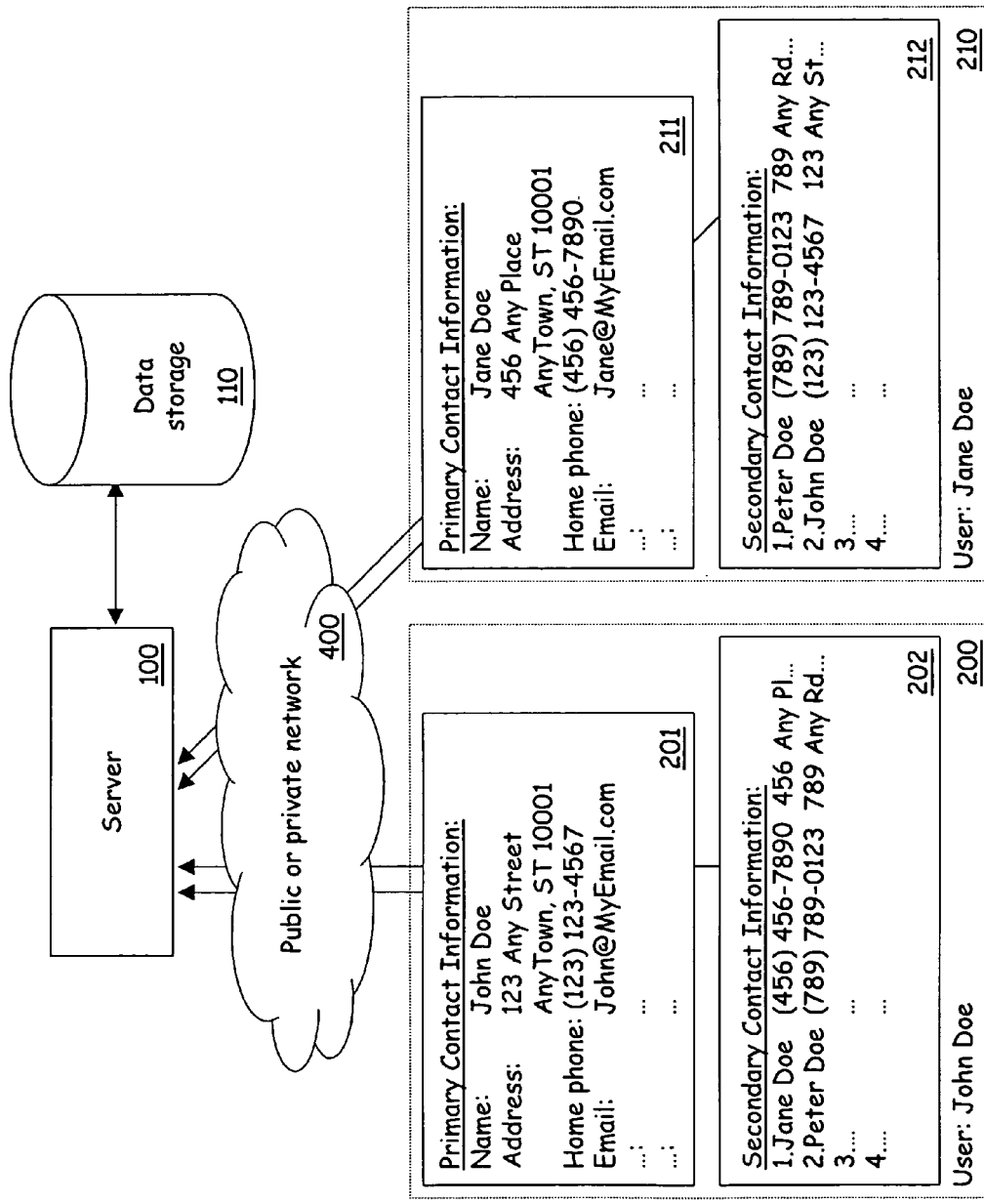
FIG. 1 is a schematic representation of the key entities for implementing the preferred embodiment of the invention in the context of a contact management system utilizing one central data storage area and shows the initial submission of contact information by users of the present invention.
Figure 2:
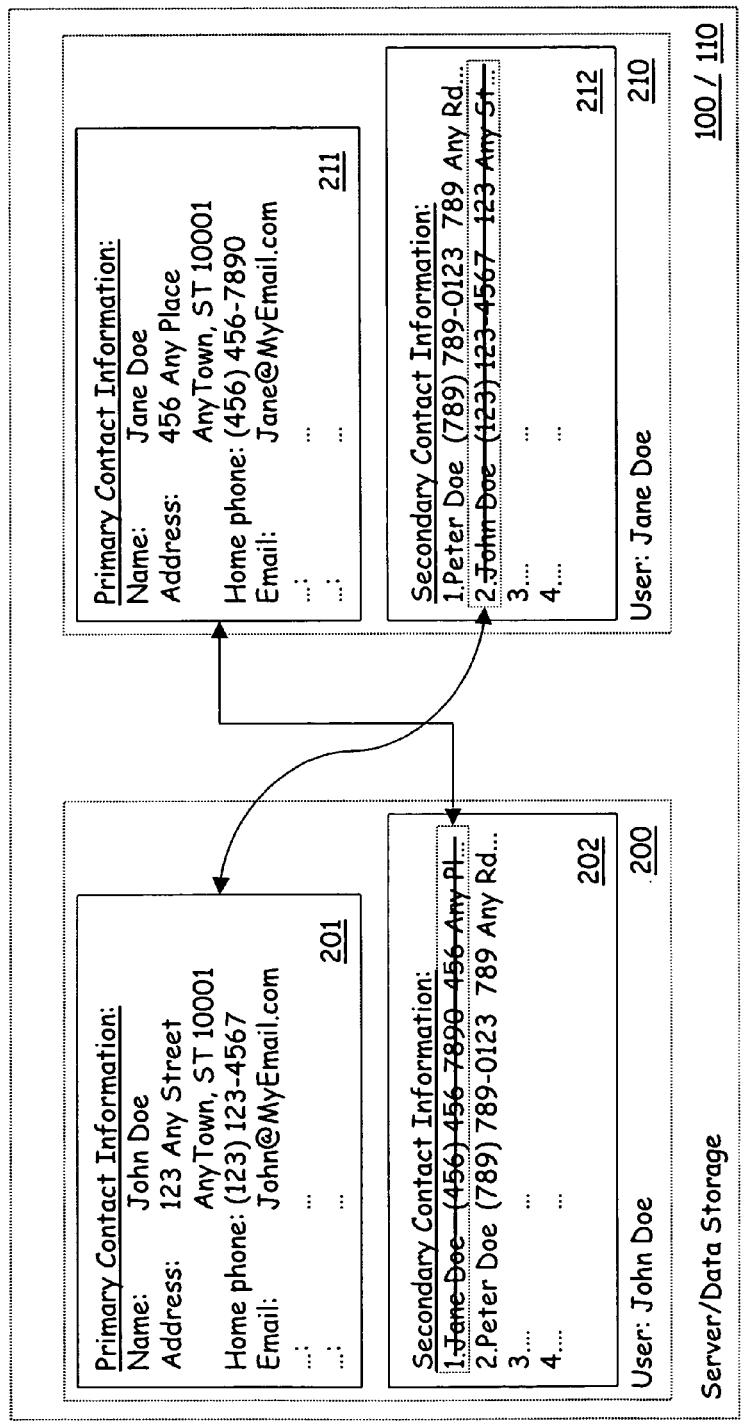
FIG. 2 is a schematic overview of the core features of the present invention, whereby static contact information is replaced with links to dynamic contact information maintained by the owner of the contact information.
Figure 3:
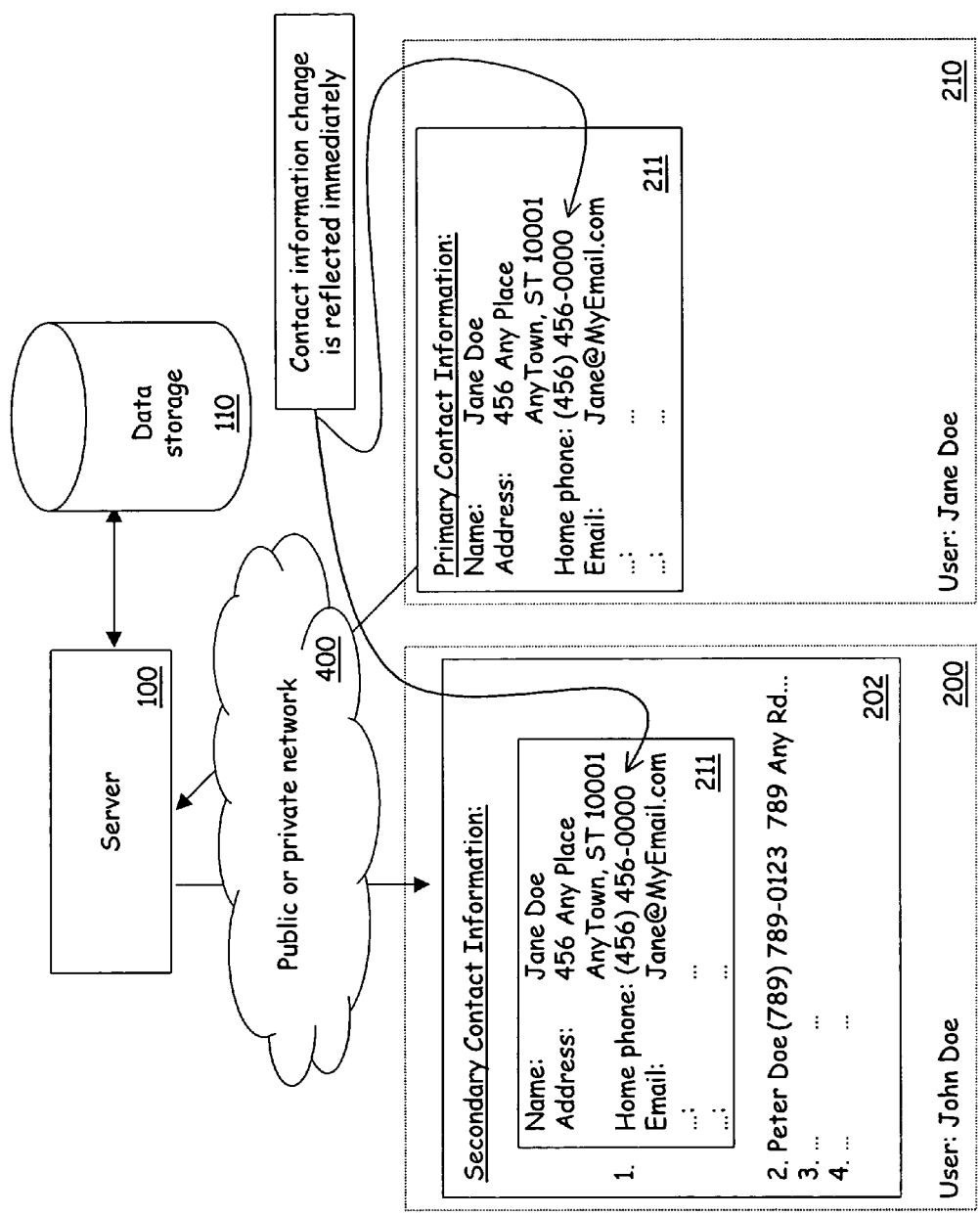
FIG. 3 exemplifies a contact information lookup under the present invention.

FIGS. 1-3 illustrate the foregoing general method and system of the invention, in the context of a contact management implementation over a commercial computer network system like the Internet and its World Wide Web architecture.

As shown in FIG. 1, the present invention includes a server 100, which includes a link to data storage 110, and, through some kind of network interface, e.g., a modem, a connection to a public or private network 400. The server 100 is an electronic data processing device with a processing unit and one or more data storage areas owned or operated by an individual or business or organization or other association utilizing the invention to facilitate management of contact information or an outside party. The server has the capability to read, manipulate, write, add, and delete information in the data storage area 110 by utilizing the server's processing unit. Contact information users 200, 210—individuals or entities comprised of multiple individuals (business, organization, institution, association, etc.)—are also connected to the same public or private network 400. The type of public or private network allows two-way communication between all parties connected to the network. A typical network 400 is a corporate Intranet or the Internet. Contact information users have access to two types of contact information: Primary contact information 201, 211 which consists of contact information (e.g., home phone number, work phone number, mailing address, e-mail address) for the user himself—best managed and maintained by the user, and secondary contact information 202, 212 which consists of contact information for other users ideally managed and maintained by those users.

The server 100 usually consists of a central processing unit (CPU), a number of input and output (I/O) devices, and some random access memory (RAM) or read only memory (ROM). The server 100 communicates with the data storage 110 through some of the input/output devices.

As shown in FIG. 1, the invention allows multiple users 200,210, . . . to submit their primary contact information 201,211, . . . or their secondary contact information 202, 212, . . . or both to the server 100. During the submission or at any time thereafter the server 100 searches the submitted secondary contact information 202,212, . . . and primary contact information 201,211, . . . submitted by other users 200,210, . . . for identical or similar entries. The level of similarity is variable and can range from matching only one element of contact information, or a part thereof, (e.g., e-mail address or telephone number) to matching all elements of contact information. If the server 100 finds within the secondary contact information 202,212, . . . submitted an identical or sufficiently similar entry to the primary contact information 201,211, . . . submitted by another user 200,210, . . . the entry within the secondary contact information 202, 212, . . . is replaced with a link or pointer to the primary contact information 201,211, . . . submitted by another user 200,210, . . . as shown in FIG. 2. The now revised secondary contact information 202,212, . . . is made available to the user 200,210, . . . who originally submitted the information, in a variety of ways (e.g., over the Internet, on the Wireless Web, via printouts).

At any time, users 200,210, . . . are allowed and encouraged to change or update their primary contact information 201, 211, . . . , which they submitted to the server 100. This can be accomplished through various means (e.g., on the Internet, the Wireless Web, submission via fax or mail, proactive telephone solicitations). Any update of primary contact information 201,211, . . . is then automatically reflected in secondary contact information 202,212, . . . entries, which have been replaced with links or pointers to primary contact information 201,211, . . . . As a result users 200,210, . . . obtain accurate and up-to-date contact information by simply accessing secondary contact information 202,212, . . . which incorporates links to primary contact information 201,211, . . . of other users 200,210, . . . on server 100 as shown in FIG. 3.

As contact information is stored or accessed centrally, it can be made available to the user through a variety of ways, including but not limited to, via the Wireless Web to cellular phones, via the Internet to desktop PCs, etc. The amount of contact information stored is independent of the viewing or retrieval device, and therefore allows access to complete and comprehensive contact information databases on devices with limited memory resources.

Because contact information may be considered private or confidential, a number of safety features can be added to the system. A sharing restriction mechanism may require the user to designate other users to whom his primary contact information should not be linked to, or only linked to upon an additional confirmation from the user who owns the primary contact information. Additionally, users may review from time to time where their primary contact information is pointing to, and make adjustments as needed. A password protection mechanism may restrict access to primary and secondary contact information.

Entering contact information may sometimes be difficult and result in errors prohibiting the described system to match and link information. An alternative to entering contact information manually is to explicitly and directly share primary contact information or a reference thereto with another user providing directly link or pointer information. One possible way to accomplish a direct link to primary contact information would be to share primary contact information on the server or another network accessible to other users. The primary contact information would then be identified by a code or number, which would be given to other users. These users then submit the code or number to the system to link that primary contact information into their secondary contact information.

It can be appreciated from the foregoing, that the core aspect of the preferred embodiment of the present invention, is that secondary contact information is linked to primary contact information without any specific action of the holders of contact information involved. The linking of contact information enables changes of contact information to be relayed substantially immediately to users of contact information. In the foregoing description, contact information analysis, match, and link establishment is based on few elements of the contact information provided (e.g., last name and phone number). It is within the broadest scope of the present invention, however, that the contact information elements searched and used to determine a match can be any or all of the elements comprising contact information.

Practitioners of ordinary skill in the fields of computer hardware and associated operating systems, applications, and communications software for the Internet, can readily implement all the features of the present invention based on the disclosure of this specification. Existing computer programs and communications techniques are readily adaptable for implementing the present invention.

The invention claimed:

1. A method for effectuating access to always current and accurate personal identifying contact information including the information elements of name and address, comprising:
provide a data processing entity for electronically storing, retrieving, searching, analyzing, and rearranging personal identifying contact information elements including name and address for a multiplicity of contact information records corresponding to a respective multiplicity of users, and which is connectable electronically to users;
wherein upon submission of said personal identifying contact information from multiple users, some or all personal identifying contact information elements are searched by the data processing entity and analyzed for similarity based upon predetermined criteria, and links or pointers between the submitted information about a user and the corresponding record of the user are established, which enable any one user to update or change personal identifying contact information electronically, and have those updates or changes available to other users.

2. The method of claim 1, wherein search and analysis of contact information elements and establishment of links or pointers are performed immediately upon submission of contact information from a user.

3. The method of claim 1, wherein search and analysis of contact information elements and establishment of links or pointers are performed periodically independent of any user action.

4. The method of claim 1, wherein users are notified of results of search and analysis of contact information elements and establishment of links or pointers immediately upon completion of search and analysis of contact information elements and establishment of links or pointers.

5. The method of claim 1, wherein users are provided an option to review existing links or pointers and to remove unwanted links or pointers.

6. The method of claim 1, wherein links or pointers are established upon entry of an alpha-numeric code defined and provided by users or the entity which is capable of storing, retrieving, analyzing, and rearranging contact information electronically and which is connectable electronically to users.

7. A system for effectuating access to always current and accurate personal identifying contact information including name and address, comprising:
 a data processing entity for electronically storing, retrieving, searching, analyzing, and rearranging said personal identifying contact information for a multiplicity of contact information records corresponding to a respective multiplicity of users, and which is connectable electronically to users;
 wherein upon submission of said personal identifying contact information from multiple users, some or all personal identifying contact information elements are searched and analyzed by the data processing entity for similarity based upon predetermined criteria, and links or pointers between the submitted information about a user and the corresponding record of the user are established, which enable any one user to update or change personal identifying contact information electronically, and have those updates or changes available to other users.

8. The system of claim 7, wherein search and analysis of contact information elements and establishment of links or pointers are performed upon submission of contact information from a user.

9. The system of claim 7, wherein search and analysis of contact information elements and establishment of links or pointers are performed periodically independent of any user action.

10. The system of claim 7, wherein users are notified of results of search and analysis of contact information elements and establishment of links or pointers upon completion of search and analysis of contact information elements and establishment of links or pointers.

11. The system of claim 7, wherein users are provided an option to review existing links or pointers and to remove unwanted links or pointers.

12. The system of claim 7, wherein links or pointers are established upon entry of an alpha-numeric code defined and provided by users or the entity which is capable of storing, retrieving, analyzing, and rearranging contact information electronically and which is connectable electronically to users.

13. A method for each of a multiplicity of primary users having respective primary personal identifying contact information elements about themselves including name and address to access always current and accurate personal identifying contact information about a plurality of other, secondary users having their own respective primary personal identifying contact information elements which is secondary personal identifying contact information to each primary user, comprising:
 providing a data processing entity for storing, retrieving, searching, analyzing, and rearranging said personal identifying contact information, connected to data communication network of users;
 wherein upon submission of revised primary personal identifying contact information from multiple primary users the personal identifying contact information associated with such primary users is updated;
 upon a primary user's request for personal identifying contact information about a secondary user, some or all contact information elements are searched and analyzed for similarity based upon predetermined criteria; and
 links or pointers to the primary personal identifying contact information of the requested entries are established in the data processing entity which enable primary users to update or change personal identifying contact information electronically and have those updates or changes be accessed by secondary users.

14. The method of claim 13, wherein search and analysis of personal identifying contact information elements and establishment of links or pointers are performed upon submission of contact information from a user.

15. The method of claim 13, wherein search and analysis of personal identifying contact information elements and establishment of links or pointers are performed periodically independent of any user action.

16. The method of claim 13, wherein users are notified of results of search and analysis of personal identifying contact information elements and establishment of links or pointers upon completion of search and analysis of personal identifying contact information elements and establishment of links or pointers.

17. The method of claim 13, wherein users are provided an option to review existing links or pointers and to remove unwanted links or pointers.

18. The method of claim 13, wherein links or pointers are established upon entry of an alpha-numeric code defined and provided by users or the entity which is capable of storing, retrieving, searching, analyzing, and rearranging personal identifying contact information.

19. The method of claim 13, wherein the address personal contact information element is an e-mail or a postal address or a web address (URL).

20. The method of claim 19, wherein another personal contact information element is a telephone number.

* * * * *